Aug. 21, 1956

R. C. RAYMER 2,760,036

METALLIC FILM POTENTIOMETER

Filed Sept. 16, 1952

ROBERT C. RAYMER,
INVENTOR.

BY
ATTORNEY.

Aug. 21, 1956 R. C. RAYMER 2,760,036
METALLIC FILM POTENTIOMETER
Filed Sept. 16, 1952 3 Sheets-Sheet 2

ROBERT C. RAYMER,
INVENTOR.

BY
ATTORNEY.

United States Patent Office 2,760,036
Patented Aug. 21, 1956

2,760,036

METALLIC FILM POTENTIOMETER

Robert C. Raymer, Pasadena, Calif.

Application September 16, 1952, Serial No. 309,768

37 Claims. (Cl. 201—55)

My invention relates to potentiometers employing resistors of the metallic film type and to the art of manufacturing such potentiometers. While my invention is described herein particularly with reference to potentiometers, many of its features are also applicable to other variable resistors and even to fixed resistors.

A potentiometer consists of a resistance having a pair of terminals at opposite ends thereof and a moving contact such as a wiper brush which may be adjusted in position between the ends. Such potentiometers may be employed not only for measuring potentials but also for dividing or proportioning potentials. For this reason, potentiometers are finding widespread use in remote control and indicating systems and in automatic control systems both in stationary equipment and in aircraft, such as drones and guided missiles. While not limited thereto, my invention is described herein with particular reference to a potentiometer of circular configuration employing a wiper brush carried by a rotary shaft.

One of the desirable characteristics sought in a potentiometer to be used in equipment carried by aircraft, is small size and low weight. The smaller and lighter the potentiometers, the greater is the quantity of equipment employing them that can be carried in an aircraft and hence the greater is the amount of information that can be transmitted either to or from the aircraft.

A second desirable characteristic in such a potentiometer is resolution, or precision. These terms refer to the accuracy attainable in settings of the moving contact. High precision generally means that the resistance may be varied in small increments.

A third desirable characteristic of such a potentiometer is reproducibility. This term refers to the accuracy with which the potential is divided or proportioned for a given setting of the moving contact time after time, as indicated, for example, by the reading of a dial attached to the rotary shaft.

A fourth desirable characteristic of such a potentiometer is the ability to operate uniformly over a wide range of temperatures. Thus, for example, it is important, where the potentiometer is carried by pilotless aircraft subjected to high as well as low temperatures for the potentiometer to withstand deterioration over a wide temperature range and to possess a characteristic resistance that is substantially unaffected by temperature over such range.

And a fifth desirable characteristic of such a potentiometer is high sensibility, that is, low stickiness or jerkiness. The sensibility is high when the force necessary to overcome friction is low in order for the potentiometer setting to change when the shaft is actuated by a low driving force. It will be understood that if the static friction or holding force between the contact and the resistor is substantial, the contact will not move smoothly and continuously but will jump from one setting to another. The elimination of such jerkiness would be of little benefit in a potentiometer employing a coiled resistor in which a contact moves from one turn to another.

However, it would be of great benefit in a metallic film potentiometer. In effect, when the sensibility is high, the "backlash" between the position of the moving contact and the position of the shaft or other actuating part connected thereto is small and the accuracy and reliability of a setting is high.

Among other desirable characteristics of such a potentiometer are: linearity, that is, the accuracy with which the resistance varies in proportion to the displacement of the moving contact; long life; ability to withstand vibration; and electrical stability.

In the past, attempts have been made to meet many of these requirements, and they have been met to a large degree, by employing as the resistance element a wire wound resistor having many many turns. But even those potentiometers that have employed wire of low or substantially zero temperature coefficients of resistivity have failed to incorporate all of the characteristics mentioned. Thus, while resistors have been devised which have incorporated some of the characteristics mentioned, so far as the applicant knows, no resistor heretofore made has incorporated all of these characteristics.

One of the objects of my invention is to provide a potentiometer having all of the aforementioned characteristics.

Another object of my invention is to provide a metallic film resistor that possesses a substantially zero temperature coefficient of resistance and that has a resistance which does not drift appreciably.

Another object of my invention is to provide a wiper brush for use with such a resistor that minimizes wear of the resistor and provides a potentiometer having high sensibility and long operational life.

Another object of my invention is to provide an efficient and effective method for producing such film resistors, brushes, and potentiometers.

One of the important features of my invention resides in a metallic film resistor produced by sputtering a metal onto an insulating base. According to my invention the thickness of the film is such that, after appropriate aging, the resistor so formed possesses a very low temperature coefficient of resistance. In practice, in the embodiments of my invention described herein in detail, this result is achieved by choosing as a base material one having a positive temperature coefficient of expansion and depositing metal thereon to a thickness that the temperature coefficient of resistivity of the film after aging is negative and of such a value that, as the temperature of the base and film are changed together, the change of film resistance produced by the change in temperature of the film is equal and opposite to the change in film resistance produced by strain due to expansion or contraction of the film. In this connection, it will be understood that the resistor film is relatively thin and is bonded intimately to its insulating base and that for this reason the resistor film expands and contracts with the base. Under these circumstances, if the resistivity of the material in the film did not change with temperature, the strain of the film produced by expansion and contraction of the base would produce a change in resistance. This change, then, is overcome in my invention by virtue of the fact that if there were no strain, the resistance of the film would change by an equal amount in the opposite direction.

Another important feature of my invention involves the aging of the metallic film to produce a resistor which possesses a high degree of stability and low drift. The aging of the film is achieved by subjecting the film for a prolonged period in an atmosphere of air heated to a temperature higher than the temperature to which the resistor will normally be exposed in use. In practice, in the aging process, I periodically measure the resistance of a portion of the film and terminate the aging after the drift of resistance falls to a suitable low value.

Still another important feature of my invention resides in the method of mounting the resistor film. According to my invention the base upon which the film is deposited is fastened to a support at points of the base which are spaced apart distances small compared with the outside dimensions of the resistor, thus, minimizing stresses within the base and distortion of the base.

For a better understanding of my invention together with other and further objects, features, and advantages thereof, as well as other characteristics of various embodiments thereof, reference is had to the following description taken in connection with the accompanying drawings. While the invention is described with reference to specific embodiments thereof and with respect to the incorporation therein of certain combinations of features, it is to be understood that my invention may be embodied in other forms, many of which do not incorporate all of the features present in the specific embodiments of my invention described hereafter. For this reason, the scope of my invention is pointed out in the appended claims.

I. NARROW-RING-TYPE POTENTIOMETER

Referring to the drawings, and particularly to Figs. 1–4 inclusive, there is illustrated a narrow ring-type potentiometer employing my invention.

A. *Construction of narrow-ring-type potentiometer*

Figures 1, 2, 3, 4, 5, 6, 7, 8:
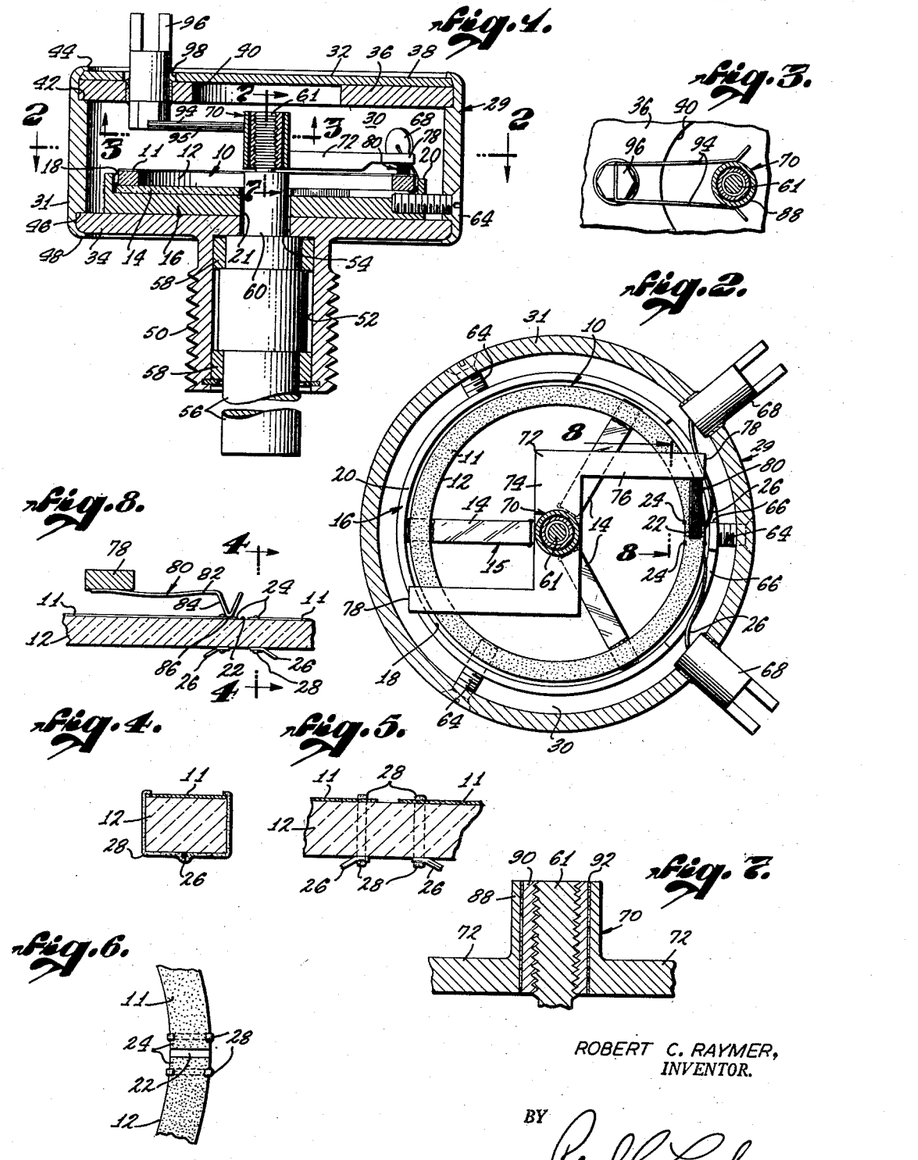
Figure 1 is a longitudinal sectional view of a narrow-ring-type potentiometer employing my invention.
Fig. 2 is a cross-sectional view taken on the plane 2—2 of Fig. 1.
Fig. 3 is a fragmentary view taken on the plane 3—3 of Fig. 1.
Fig. 4 is a cross-sectional view taken on the plane 4—4 of Fig. 8.
Fig. 5 is an enlarged fragmentary cross-sectional view of the film resistor employed in the potentiometer of Figs. 1 and 2.
Fig. 6 is a fragmentary detailed view of this film resistor.
Fig. 7 is a cross-sectional view taken on the plane 7—7 of Fig. 1.
Fig. 8 is a fragmentary view showing the resistor and the wiper brush.

1. *The resistor.*—This potentiometer includes a resistor 10 comprising a metallic film 11 deposited upon a narrow, flat, circular insulating ring or disk 12 cemented to a plurality of insulating legs 14 extending radially inwardly. The outer ends of the legs 14 are cemented to the ring 10, thus providing a spider-like resistor base 15. The inner ends of the legs are cemented to a flat movable intermediate support member in the form of a plate 16 that forms the base of a circular metallic cup 18 having an annular peripheral lip or flange 20. The plate 16 is provided with a small central opening 21.

The resistor film 11 is of circular configuration, being a substantially complete circle except for a small break or gap 22 between opposing ends 24 thereof. Two conducting leads 26, 26 are cemented to the underside of the ring 12 opposite the abutting ends 24 of the resistor, the two leads being conductively connected to these abutting ends by means of small thin deposits 28 of conducting cement leading from the underside of the ring to the edges of the opposing ends.

The method of manufacturing the resistor 10 is described in detail hereinbelow.

2. *The case.*—The potentiometer comprises a metallic case 29 enclosing a cavity 30. The case 29 comprises an outer cylindrical member 31 having top and bottom end walls 32 and 34. The upper end wall 32 consists of an inner plate 36 and a cover plate 38, the inner plate having a central opening 40 therein for purposes to be set forth hereinafter. The upper end wall abuts an upper shoulder 42 in the cylindrical member 30, and is firmly held in place by means of an annular lip 44 rolled over the upper part thereof.

The lower end wall 34 consists of a plate that is likewise abutted against a lower shoulder 46 in the cylindrical member and is secured firmly in place by means of a second annular lip 48 rolled over its edge.

An externally threaded boss 50 formed unitary with the lower end plate extends downwardly therefrom, the boss being provided with a central bore 52 of cylindrical configuration having a reduced bore 54 formed at the upper or inner end thereof.

In practice a case having a diameter of about one inch has been employed and the case is composed of aluminum.

3. *The shaft.*—The potentiometer also comprises a rotary shaft 56 that is mounted within the boss in bearings 58 at opposite ends of a ferrule or ring. The shaft 56 projects through the central opening 54 in the lower end plate 34 and the opening 21 of the support plate 16 into the cavity 30 within the case 29. The shaft is provided with a reduced stub or extension 60. The upper end of the stub 60 is further reduced and is threaded to form a connection 61.

The support plate 16 is rendered radially adjustable relative to the axis of the rotary shaft 56 by means of three equally spaced centering screws 64 extending radially inwardly through the cylindrical member 31 and threadably engaging taps in the support plate. The threads interconnecting the screws and the support plate have sufficient play to permit the radial adjustment of the relative position of the support plate and the rotary shaft.

The leads 26, 26 extend through gaps 66, 66 in the lip 20 of the cup to a pair of terminal lugs or connectors 68, 68 that extend radially outwardly from the cylindrical member 31 midway between its ends. The connection is suitably insulated from the case.

The case and the shaft are all composed of metal, thus shielding the resistor film from external electric fields.

4. *The wiper brush.*—A conducting hub 70 composed of brass is firmly secured and insulated from the inner end of the shaft connector 61, being substantially centrally mounted within the case. The hub comprises a pair of symmetrically arranged brush support arms 72, 72 formed integrally therewith and extending outwardly therefrom. Each of said arms consists of an inner part 74 and an outer part 76 formed at right angles thereto. The corresponding parts of opposite arms are diametrically located about the axis of the shaft 56 to provide a balanced system. The outer end 78 of each of the arms is located beyond the outer periphery of the circular resistor and a moving contact in the form of a multistrand wiper brush 80 extends from the outer end of one of the arms 72 along a line that is parallel to the inner part 74 of that arm, that is in a direction that is tangential to the resistor. The wiper brush 80 is secured to the end of the arm in a manner to be described in more detail hereinbelow. Since the total mass of the wiper brush 80 is but a small fraction of the mass of the two arms 72, 72, the brush does not substantially disturb the balance of the system. However, if more accurate balancing is desired it may readily be provided by any conventional method.

The wiper brush comprises a plurality of resilient filamentary conducting members 82 extending in one direction from the brush support arm, the filamentary members being closely spaced apart or even in contact. The free ends of the filamentary members 82 are bowed or bent, or otherwise formed, to form V-shaped contact fingers 84 that are curved at their roots, as illustrated in Fig. 8. The legs of the V-shaped fingers form equal and opposite angles with the plane of the resistor film 11, the angle between the legs being about 45° and the apices or knuckles 86 of the fingers are arcs of small radius. The apices 86 of the respective contact fingers of the filamentary members lie on a common radius extending from the axis of the shaft. The apices 86 are accurately aligned and are narrow enough to avoid shorting the opposing ends 24 of the resistor when the wiper brush passes over the gap 22. The respective filamentary members lie in parallel planes that are tangent to the orbits of the contact fingers 84 and perpendicular to the plane of the resistor film itself.

The method of manufacturing the wiper brush is described in detail hereinbelow.

5. *The slip ring and stationary brushes.*—The hub 70 also comprises a cylindrical portion 88 extending axially from the arms 72, which portion serves as a slip ring. A threaded brass fitting 90 is centrally mounted within the hub, being secured in place by means of a body 92 of an insulating cement filling a narrow annular space between the fitting and the hub.

Two brushes 94, 94 each consisting of a plurality of filamentary conducting members 95 contact the slip ring at opposite sides thereof. The filamentary members of each brush are parallel and in a common plane and their outer free ends are bent outwardly to facilitate assembly. The brushes 94, 94 are formed by legs of hairpin-shaped members supported at the inner end of a wiper-brush lug or terminal 96 insulatingly supported by the main upper end plate 36 and extending through a clearance hole 98 in the cover plate 33.

In making the slip ring brushes 94 a series of wires of uniform length are cemented in place in parallel relationship with each other in a vertical slot at the end of a brush lug 96 with conducting cement of a type mentioned hereinafter and the cement coated with a protective material. The wires are then bent into a U-shaped configuration and the free ends thereof bent outwardly, as indicated in Fig. 5. The spacing between the outer ends when they are free is less than the diameter of the slip ring so that the brushes are resiliently pressed firmly against the slip ring. The filamentary members 95 are made of wire composed of a soft material, such as platinum, and have a diameter of about 0.005 inches.

B. *Manufacture of resistor*

In the best mode of practicing my invention that I have discovered up to the present time, the resistor 10 is made by sputtering a film 11 of rhodium onto a flat resistor base ring 12 composed of Pyrex and the film so formed is aged by heating in air.

Figure 9:
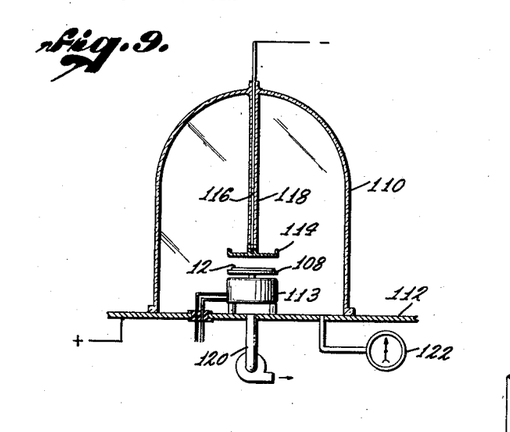
Fig. 9 is a schematic view of sputtering apparatus employed in my invention.

A suitable rhodium film is deposited on a base ring 12 by mounting the ring upon an anode 108 in the form of a metallic plate within a bell jar 110 sealed to a metallic table 112 as illustrated in Fig. 9. Maximum uniformity of deposit and hence maximum linearity of the resistance of the final resistor formed is achieved by rotating the plate 108 by means of a synchronous motor 113 upon which it is supported. The base ring 12 is thus mounted beneath a sputtering cathode 114 suspended within the bell jar at the lower end of a stem 116 enclosed in a glass sleeve 118. The space within the bell jar is evacuated through a pipe 120 and the pressure of the residual air is measured by means of a suitable pressure measuring device, such as a Pirani gauge 121.

In order to sputter the rhodium film, I employ a cathode 114 consisting of chemically pure rhodium or a cathode having a suitable base, such as copper, plated with chemically pure rhodium. The cathode 114 is centrally mounted above the ring 12 to be coated and is spaced therefrom a suitable distance. A portion of the ring is covered along a narrow radial line by means of a piece of glass or cement or other suitable mask to form the gap 22 shown in Fig. 2.

In practice, I have been able to produce rhodium films having suitable characteristics by mounting the ring about one-quarter inch above the anode or table and locating the cathode about one-half to one inch above the ring. Thereafter, when the pressure has been reduced to a value between about 10 and 100 $\mu$ Hg, a D. C. voltage of about 1500 to 3000 volts is applied for a period of between 3 minutes and 30 minutes, depending upon the pressure, and the dimensions, condition and size of the cathode and the spacing between the cathode and the ring. For example, with a clean circular cathode having a diameter of two inches, after a pressure of 50 $\mu$ Hg, satisfactory sputtering is attained by applying a potential to provide a sputtering current of 10 ma. continuously for about 6 minutes. In this process, the pressure referred to is that which exists at the commencement of the sputtering process since the pressure falls during the sputtering process. Initially the voltage is about 2000 volts but as the sputtering process continues, the voltage is changed to maintain the current constant at about 10 ma.

Immediately upon completion of the sputtering process, air is admitted to the bell jar and the resistor ring is removed. The edges of the sputtered film are cut by filing with a grinding stone in order to isolate the film on the flat surface from any rhodium deposited on the sides of the ring.

Thereupon, terminals 28 are formed at the opposing ends of the resistor film on opposite sides of the gap 22 formed by the mask. One way to form the terminals is to coat the bottom surface and the sides of the ring 12 with conducting cement, permitting small quantities of the conducting cement to lap over the film a short distance at the inner and outer edges thereof. Conducting leads are embedded in the cement on the unsputtered side of the ring while the cement is wet and the cement is then permitted to dry.

The resistor so formed is then connected to a Wheatstone bridge or other resistance measuring device and the resistor unit is placed in an oven, the temperature of which is raised quickly to 500° F. or to any other suitable temperature substantially equal to or higher than the temperature at which it is intended to use the resistor. It is to be noted that the aging temperature is below the melting point of solid rhodium and the softening point of Pyrex, but it must be remembered that the film is highly attenuated and that therefore portions thereof easily interlock with the base. The resistor is aged at this temperature until its resistance reaches a substantially constant value. In practice, the resistance is measured periodically at intervals of about fifteen minutes or less and the heating is continued until the drift in the resistance, that is, the percentage change per hour reaches a relatively constant low value.

Figure 10:
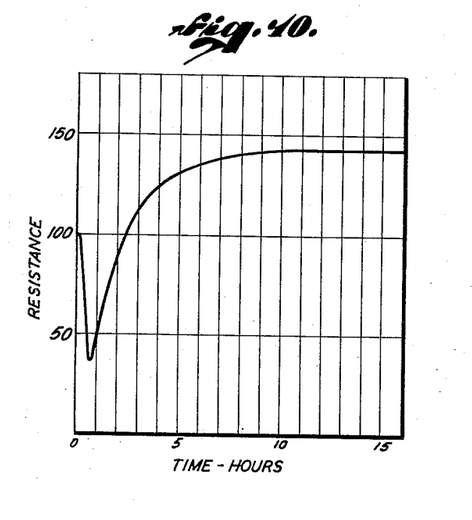
Fig. 10 is a graph showing the effects of aging a film resistor in accordance with my invention.

As indicated in Fig. 10 where ordinates represent resistance in percentage of its initial value and abscissae represent time, it is observed that during the initial heating process, the resistance falls quickly to about two-thirds its initial value. Thereafter, it immediately increases rapidly to a value of about one and a half times its initial value and it continues to rise at a lower and lower rate to a value about twice its initial value. The minimum resistance is reached in about 20 minutes and the knee of the resistance-time curve is reached in about five hours and the drift reaches a relatively low value of about one-half percent per hour in about fifteen hours. When the drift has attained that low value, the oven is opened, permitting atmospheric air to enter at ambient temperature, causing the resistor to cool in about three-quarters of an hour.

After the ring 12 has cooled, the legs 14 are cemented to the ring at equally spaced points thereof and the central ends of the legs are cemented to the support plate 16. The legs and the ring are composed of the same material and so fastened to the plate 16 so that the legs and ring will not be unduly stressed or distorted and will remain attached to the plate 16 in spite of differential expansion of the legs and ring relative to the plate 16. The employment of a reduced stub at the inner end of the shaft 56 permits securing the legs 14 to the plate 16 at closely spaced points.

By sputtering rhodium in the manner described onto a Pyrex base and aging the resultant resistor in the manner described, I am able to produce a resistor which has a substantially zero temperature coefficient of resistance, that is a coefficient which is very low compared with that of a large mass of the same metal. If a thinner film were applied, the temperature coefficient of resistance would be negative, whereas if a thicker film were applied, the temperature coefficient of resistance would be positive. In practice, I have been able by this process to produce resistors having a resistance that does not vary more than about one part in ten thousand per ° C. in the temperature range from about 50° F. to about 500° F. and which at the same time has a very low drift and other desired physical properties as described herein. Over this same temperature range, the resistance of a large mass of rhodium free from stress would change more than 44 parts in ten thousand per ° C.

Figure 11:
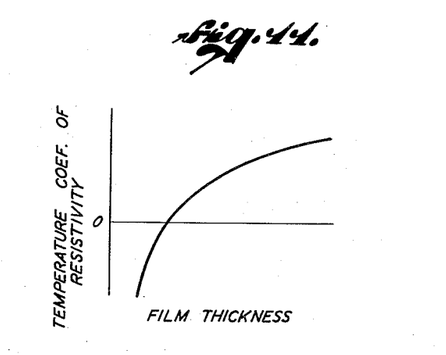
Fig. 11 is a graph showing the variations of temperature coefficient of resistivity of a metallic film as a function of film thickness.

The attainment of a substantially zero coefficient of resistance may be explained somewhat as follows. When a thin film of metal is produced the temperature coefficient of resistivity varies with its thickness, being negative for films thinner than a certain amount and positive for thicker films, as indicated in Fig. 11. For any such films, the resistance between any two points increases with the strain of the film. When such a film is deposited upon a base, such as Pyrex, then when the base and the film are heated together, the resistance between any two points of the film varies partly as a function of strain, which depends substantially entirely on the temperature of the base, and partly as a function of the temperature of the film itself. Thus, the resistance between any two points of the film is increased because of the heating of the base but is either increased or decreased because of the heating of the film according to whether the temperature coefficient of resistivity of the film is positive or negative. According to my invention, the sputtering conditions are so controlled that the thickness of the aged film is such that the change in resistance between two points of the film caused by the heating of the film itself compensates for the change in resistance due to the strain of the film caused by the heating of the base upon which it has been deposited.

In the best mode of practicing my invention I employ a base composed of material which possesses a small linear temperature coefficient of expansion. Such materials include "Pyrex" and fused quartz and "Vicor" and crown glass, which have linear temperature coefficients of expansion approximately $33 \cdot 10^{-7}/°$ C., $6 \cdot 10^{-7}/°$ C., $7 \cdot 5 \cdot 10^{-7}/°$ C. and $90 \cdot 10^{-7}/°$ C., respectively, over the range of temperatures in question. By employing such a material, the strain produced by any given temperature change is minimized, thus permitting the use of a film of maximum thickness, while at the same time producing a resistor having a substantially zero temperature coefficient of resistance.

It is to be noted that if a material having a negative temperature coefficient of expansion is employed as a base for the film, then the thickness of the film should be somewhat greater and such that the film material will have a positive temperature coefficient of resistivity.

The resistor so produced also has substantially uniform resistance per unit length throughout its entire length; in other words, the resistance is substantially linear.

C. Manufacture of wiper brush

Figure 12:
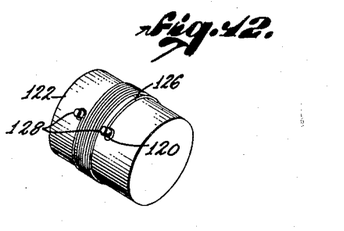
Fig. 12 is a perspective view of apparatus employed in making a wiper brush.

In the manufacture of the wiper brush, a pair of diametrical holes 122 are formed in a carbon rod 123 having a diameter of about one-half inch or more, as shown in Fig. 12. A piece of wire 126 composed of good contact material is then wrapped helically on the carbon rod, being secured thereto by means of stakes 128 holding the ends thereof in the holes. For this purpose, I have employed wire having a diameter of about .0012 inch and composed of commercially pure platinum. In practice, about nine turns of wire are employed and the circumference of the carbon rod is many times the length of the brush to be formed. While the wire may be lap-wound on the carbon rod with the successive turns thereon in contact, preferably they are space-wound. If space-wound, the gaps between the successive turns is preferably smaller than the diameter of the wire.

Thereafter, the carbon rod with the wire in place is immersed in a plating solution, such as a plating bath of copper sulphate, copper cyanide, or copper carbonate. While so immersed, copper is deposited upon both the wire and upon the rod electrolytically, thus bonding the successive turns of wire together in a single cylindrical body. Thereafter, the carbon rod with the plated wire is removed, washed with water, and dried. The ends of the wire are then cut free of the stakes 128 and the stakes are removed.

The cylindrical body of wire embedded in copper is then sheared transversely by means of a razor blade pressed thereagainst along a plane extending close to the central axis of the carbon rod. The cylindrical body is then peeled off the carbon rod. In this operation, the copper that was deposited on the portions of the carbon not covered by the portions of the wire coil remain in place.

Figure 13:
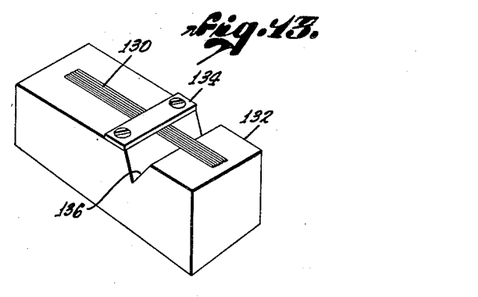
Fig. 13 is a perspective view of a jig employed in making a wiper brush.
Figure 14:
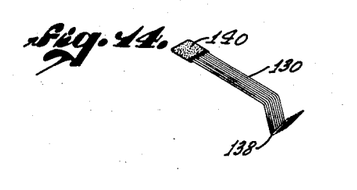
Fig. 14 is a perspective view of a wiper brush.

In peeling off the cylindrical wire body from the carbon rod, care is exercised to avoid twisting the wire body. When removed, the wire body is flattened by bending successive portions of it until nearly straight and then it is rolled between a flat plate and a cylindrical rod. The flattened body of wire so formed is then cut to the desired length, severing individual brush blanks 130, as shown in Fig. 13. In practice, I have employed blanks having a length of about one-fourth inches.

To form a wiping brush from a brush blank 130, the blank is clamped onto the surface of a forming die 132 by means of a clamping bar 134 fastened thereto by screws, as shown in Fig. 13. The forming die is provided with a V-shaped groove 136 along the edge of the clamping bar and parallel thereto. A short portion of the brush blank 130 extends past the groove. With the brush blank so mounted in place, a dull razor blade is employed to press the short end of the blank into the groove 136, thereby forming a V-shaped contact portion 138.

The brush blank 130 with the contact element formed thereon is then removed from the die and the end of the blank remote from the contact portion is coated with a body 140 of conductive cement, as shown in Fig. 12. After this cement dries, the joint is covered with a protective coating of acid-resisting material. A suitable conducting cement that has been employed for this purpose is a graphitic ceramic cement sold under the trademark "Conductalute" manufactured by Sauereisen Cement Co. of Pittsburgh, Pennsylvania. Another suitable conductive cement that has been employed for this purpose is a mixture of silver and ceramic emulsified in oil and sold under the name "Silver Paste No. 38" manufactured by the Hanovia Chemical and Mfg. Co. of Newark, New Jersey. An acid-resisting material suitable for this purpose consists of paraffin, beeswax, acetate cement and many other materials.

The intermediate brush blank 130 having one end thereof so treated is then immersed in an acid bath, such as concentrated nitric acid, thereby dissolving the metallic sheath of copper which bonds the wires together without injuring the wire itself. After the metallic plating material is so dissolved, the blank is removed from the acid bath and the acid-resisting material is then removed. For example, if paraffin has been employed it may be removed by heating. If acetate cement has been employed it may be removed by means of a suitable solvent, such as acetone. The brush 80 (see Fig. 8) so formed is then dipped in an alkaline solution, such as 10% ammonium-nitrate to neutralize any acid adhering thereto. The brush is then washed in distilled water and dried.

The brush 80 formed in the manner described above is now secured to the outer end of the brush arm 76 by means of such conducting cement and after drying, the conducting cement is coated with a suitable material such as a heat-resisting paint or lacquer that is impervious to moisture. The brush is thus cemented in place at a slight angle of about 20° from the plane of the brush arm, thus completing the wiping brush subassembly.

In the meantime, the hub 70 including both arms and slip ring 88 is machined from a single piece of material. Immediately after machining the slip ring 88 is polished and is then plated to a thickness of about 0.0005 inch with rhodium or any other hard noble metal. The brass fitting 90 is then cemented onto the hub 70 (see Fig. 7).

D. *Assembly*

The general arrangement of the parts of the potentiometer facilitates both assembly and inspection. In assembling the potentiometer, the lower end plate 34 is first mounted in place and the shaft with its bearings 58 installed thereon, being locked in place by means of a retainer ring 100.

The subassembly of the resistor 10 and support plate 16 is placed upon the lower end plate 34 and secured in place by means of the screws 64.

The free ends of the leads 20 are then cemented with conducting cement to the inner ends of the lugs 68, the leads being led through the gaps 66 in the lip of the cup along a path where they will not be struck by the brush support arms 72.

The subassembly including the hub 70 with the threaded fitting and the wiper brush 80 secured in place is now mounted upon the threaded end of the shaft. In securing the brush assembly to the shaft, the shaft threads are first coated with a thin film of thermosetting cement. In this operation, the brush assembly is held in place within the case and the shaft rotated. As the shaft rotates, the contact fingers of the brush finally come into contact with the resistor film and are resiliently pressed against it more and more as the rotation of the shaft continues. Rotation is thus continued until the brush filaments are strained beyond their yield point. In determining whether this condition has been attained, the shaft is unscrewed to determine whether the brush has been permanently deformed. When such a condition is found, the shaft is then turned back to the position in which the deformation occurred. When this condition has been attained, the pressure of the brush on the film will be approximately of a predetermined amount regardless of slight variations in inclination of the brush relative to the brush arm. By setting the pressure in this manner, errors in estimating the proper number of times to turn the shaft to attain a predetermined pressure is avoided. With the hub in the position so determined, the unit is heated at a temperature which will cause the thermosetting cement to harden.

The inner end plate 36 with the brush lug 96 and the slip ring brushes 94 thereon is then mounted in place against the upper shoulder 42 of the cylindrical case member 31. In this operation, care is exercised to assure resilient contact of all the filaments of the slip ring brushes 94 with the slip ring 88, the aperture 42 being available for adjustment and observation of the various elements when in place.

The cover plate 38 is then mounted in place with the clearance hole 98 surrounding the brush lug 96 and the upper end of the case is rolled to complete the potentiometer.

In order that the resistance between either of the terminal lugs 68 and the wiper brush 80 may be a linear function of the angle of rotation of the shaft 56, the resistor is centered with respect to the shaft by manipulation of the centering screws 64. In the event that the base is slightly off-center relative to the cathode during the sputtering operation or under some other conditions, the film desposited on one side of the base may be slightly thicker than the film deposited on the opposite side of the base. Some compensation for this effect may be achieved by adjustment of the centering screws, thus, in effect, decentering geometrically but centering the resistor electrically with respect to the shaft. For this reason where the term "centering" is employed in the claims, it is to be understood that electrical centering is meant unless otherwise specified.

II. WIDE-RING-TYPE POTENTIOMETER

Figures 15, 16, 17, 18, 19, 20, 22:
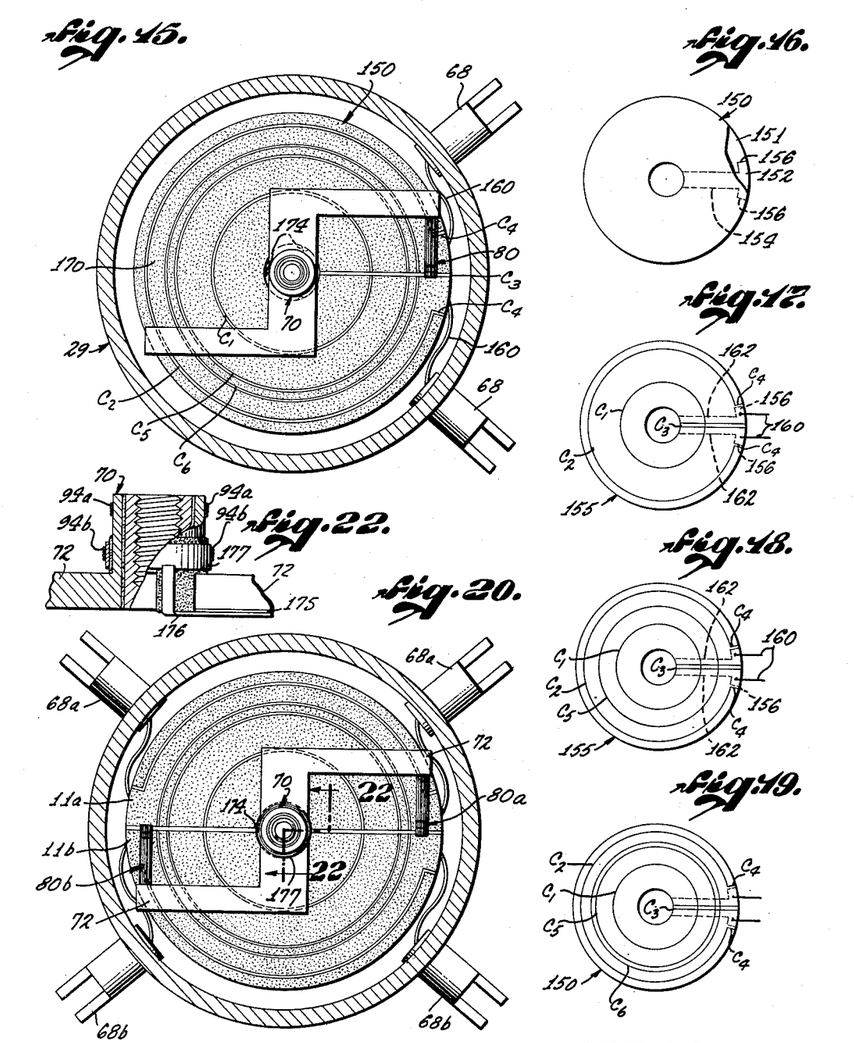
Fig. 15 is a cross-sectional view, like that of Fig. 2, of a wide-ring-type potentiometer.
Figs. 16, 17, 18 and 19 are plan views showing a wide-ring-type resistor at various stages of its manufacture.
Fig. 20 is a cross-sectional view, like that of Fig. 2, of another wide-ring-type potentiometer.
Fig. 22 is a fragmentary view of the slip rings employed in the potentiometer of Fig. 20.

Another embodiment of my invention is illustrated in Fig. 15. In the potentiometer illustrated in this figure the metallic film is formed on a disk having a relatively small hole in the center, thus forming a wide ring or annulus, and eliminating the need for the legs 14 of the narrow-ring type base illustrated in Figs. 1 and 2. The use of such a disk as a base for the resistor film also has other advantages which will become apparent from the description below.

In the production of the resistor 150 illustrated in Fig. 15, a circular Pyrex disk 151 of appropriate size having a relatively small hole in the center thereof is treated by the process explained in connection with Figs. 16 to 19 inclusive. This disk is first coated on one side thereof along a radial line with a solution of gold chloride suspended in lavender oil. The coating is applied by painting it onto the disk with a brush consisting of a single strand of wire having a diameter of about 0.001 inch and having a small finger formed in the lower end thereof. The coating 152 so applied is of T-shape, as indicated in Fig. 16, having a long radial leg 154 and also having short narrow cross arms 156, 156 along the periphery of the disk.

The disk 151 bearing the wet coating 152 of gold chloride is then treated by subjecting it to the minimum softening temperature of the base (about 1040° F.), thus reducing the gold onto the softened Pyrex and bonding a thin T-shaped strip of gold on the surface. The thickness of the strip of gold so produced may be about 10 to 50 $\mu$. Such a strip is electrically conductive and adheres firmly to the disk. Any non-conducting residue remaining after treatment is removed by cleaning the disk by exposing it to a vapor of a suitable solvent, such as trichlorethylene for several minutes. Other materials suitable for use in such strip are platinum and silver, since they, like gold, may be readily deposited by a reducing process and they possess low resistivity and are non-corrosive. The heating process employed in forming the gold strip also helps clean the Pyrex preparatory to sputtering.

The disk 151 with a strip of gold formed thereon is then sputtered with rhodium in the manner described hereinabove, forming a resistor blank 154, as illustrated in Fig. 16. The thickness of the rhodium film is between about 0.003 and about 0.010 μ, being much thinner than the gold strip. The resistor blank 154 so formed may then be aged at this point by the process hereinabove described.

One of the advantages of forming such a resistor blank 154 is that the blank may be scribed in the manner described below to form a resistor 150 having a predetermined resistance.

In order to form a resistor having a predetermined resistance, the resistor blank 154 is mounted centrally on a suitable jig (not shown) where it is scribed with a diamond cutter, as illustrated in Figs. 17, 18 and 19. A circular gap $C_1$ of relatively small radius is first cut through the film and the underlining gold strip by scribing. A second gap $C_2$ of relatively large diameter forming a substantially complete circle is also scribed in the film, this circle being tangent to the inner edges of the T-arms 156, 157 and terminating at the outer ends of those arms. Next, a radial gap $C_3$ is scribed through the film and the gold strip midway between the opposite edges of the gold strip. Finally, two radial gaps $C_4$ and $C_5$ are scribed through the film along the outer edges of the T-arms 156, 157, terminating at the ends of the circular gap $C_2$.

After this scribing process has been completed, two conducting leads 160, 160 are secured by means of conductive cement to the film directly opposite the T-arms. As a result, an electrical resistor of C-shape is isolated on the base, the resistor having a pair of terminals 162, 162 provided by the underlying portions of the gold strip, which terminals are electrically connected to the leads 160.

The resistance of the gold terminals per square is much lower than the resistance of the rhodium film per square. For this reason, when current is passing through the leads 160, 160, there is very little potential drop between opposite edges of the rhodium resistor along any radial line, including either of those adjacent the gap $C_3$.

If desired, the sequence of scribing the five gaps $C_1$, $C_2$, $C_3$, $C_4$ and $C_5$, and the cementing of the leads 160, 160 in place may be altered. But in any event, the spacing between the gaps $C_1$ and $C_2$ is so chosen as to render the resistance of the annular resistor formed therebetween a small fraction of the final resistance sought. Thereupon, a resistance measuring device is connected between the leads, and the resistor, if not already properly aged, is now aged in accordance with the process hereinabove described. The advantage of aging at this point instead of previously lies in the fact that the drift of resistance may be measured and the aging process discontinued when the drift has reached a suitably low value, as previously explained.

After the aging process has been completed and the resistor has cooled to room temperature, a third circular gap $C_6$ is scribed through the film and the gold strip between the gaps $C_1$ and $C_2$, thereby isolating a narrower annular resistor, as shown in Fig. 16, having a resistance that is about one-half to two-thirds of the value of resistance sought. Now knowing this resistance and the radii of the two gaps $C_2$ and $C_6$, a computation or an estimate is made to determine the radius of an additional gap $C_7$, shown in Fig. 19, required to produce a resistor having the desired value of resistance. In this final scribing process, the location of the gap $C_6$ may be determined by employing the formula $$R = \frac{2\pi F p}{\log \frac{r_o}{r_i}} \quad (1)$$

where:

$p$ = resistance of film in ohms/square $F$ = effective fraction of a complete circle occupied by resistor $r_o$ = outer radius of resistor $r_i$ = inner radius of resistor $R$ = resistance of resistor between terminals.

Thus, when the resistance of the resistor formed between the gap $C_6$ and $C_2$ is measured, the value of the resistivity is determined from the formula $$p = \frac{R_{6,2}}{2\pi F} \log \frac{r_2}{r_6} \quad (2)$$

where:

$R_{6,2}$ = the value of resistance measured $r_2$ = radius of gap $C_2$ $r_6$ = radius of gap $C_6$.

Thereupon, the value of the radius $r_7$ of the gap $C_7$ is determined from the formula $$p = \frac{R}{2\pi F} \log \frac{r_2}{r_7} \quad (3)$$

In the above formulas, the abbreviation "log" indicates logarithm to the base $e$. It is to be noted that even if F is not accurately known, $r_7$ may still be calculated accurately. After the radius $r_6$ of the circular gap $C_7$ has been determined, this gap is also formed by scribing through the film and the gold strip.

The resultant circular C-shaped resistor film 170 so isolated is secured to the support plate 172 by cementing it thereto at central points 174. The base plate with the resistor applied thereto is then centrally mounted within the case 29 of the potentiometer in the manner hereinbefore described and the wiper brush and stationary brushes mounted in place also in the manner hereinbefore described.

In an alternate method of manufacturing the metallic film, the electrical resistance of the film is measured during the sputtering process and the sputtering is terminated when the resistance attains a predetermined value. In this method, for example, the two T-arms 156 and 157, are formed on the disk 151 before the disk is placed in the sputtering chamber and the two conducting leads 160, 160 are secured directly to the outer ends of these arms. The resistor blank 154 so formed is then placed in the sputtering chamber and the gap between the two T-arms 156 and 157 is masked or otherwise shielded to prevent any metal from being sputtered onto the portion of the disk in that gap. The conducting leads 160, 160 are then lead through suitable insulated bushings in the floor 112 of the sputtering chamber and are connected to a resistance measuring device. Then, as the sputtering proceeds, the resistance of the film being formed is measured at regular intervals by means of a circuit which passes only a very low current through the film. By means of this arrangement, it is possible to determine the thickness of the film at various stages in the sputtering process even though the sputtering rate varies between the sputtering of different resistors. By so measuring and controlling the thickness of the film during the sputtering process, closely reproducible results are attained, thereby achieving not only in the control of the resistance but also in the control of the temperature coefficient of resistance. After the sputtering has been terminated, the resistor blank so formed is aged and is then scribed by forming gaps $C_1$, $C_2$, $C_3$, $C_4$, $C_5$ and $C_7$ in the manner described above.

Figure 21:
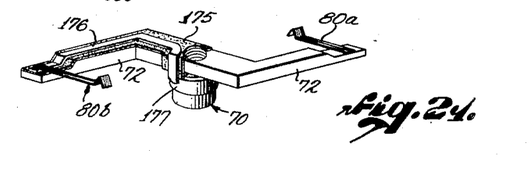
Fig. 21 is a perspective view of the wiper brush employed in the potentiometer of Fig. 20.

In an alternative embodiment of the invention illustrated in Figs. 20–22 inclusive, two film resistors are formed. This potentiometer is substantially the same as that illustrated in Fig. 15 except that two resistor elements 11a and 11b, each extending over an arc slightly less than 180° and two wiper brushes 80a and 80b, are employed to contact the two resistors 11a and 11b respectively. In this case, two sets of lugs 68a, 68a and 68b, 68b are employed to make electrical connection with the ends of the respective resistors 11a and 11b. In this arrangement, a coating 175 of shellac is deposited on the underside of one of the wiper arms 72 and a strip 176 of conductive metal is formed thereon. The wiper brush 80b corresponding to this side is conductively cemented to the conductive strip 176, thus being insulated from the other wiper brush 80a. At the inner end, the conductive strip 176 is electrically connected to an auxiliary slip ring 177 which is mounted concentrically upon and insulated from the slip ring formed by the hub 70. A pair of auxiliary stationary brushes 94b, 94b is employed that is arranged in a manner similar to the first stationary brushes 94a, 94a of the same construction as those hereinbefore described. The auxiliary brushes 94b, 94b make contact with the auxiliary slip ring 177 and hence with the corresponding wiper brush 80b, the other slip ring 70 being contacted by the other stationary brushes 94a, 94a.

The potentiometers formed by scribing have all the advantages of that previously described herein and the further advantage that they may be readily designed to provide a predetermined value of resistance. Furthermore, by forming resistor blanks in the manner hereinabove described a series of blanks may be readily prefabricated and later scribed when desired to produce resistors having different specified values of resistance.

III. GENERAL REMARKS

In the embodiments of the invention described above, the filaments of the wiper brushes are arranged tangentially relative to the orbits of their paths at the points at which they make contact. As a result of this arrangement, the contact fingers tend to travel smoothly along circular paths instead of jumping or snapping periodically along a zigzag path. Thus, the tangential arrangement helps assure that a fixed correspondence shall exist between the proportioning action of the potentiometer and the position of the shaft.

Also, to achieve the desired action, the brush is made of a relatively soft metal, while the filament resistor is made of a relatively hard metal, thus minimizing or avoiding wear of the film resistor. Both the filament resistor and the brush are made of corrosion-resistant materials and they are non-galling. In practice, the brush is composed of a soft noble metal or a noble metal alloy. Among the metals found suitable for use in the wiper brush are platinum, paladium, nickel, gold, and soft alloys thereof.

While I have described my invention only with reference to the sputtering of rhodium resistor films, other metals may be selected for sputtering from the class that consists of rhenium, iridium and ruthenium, as well as rhodium. All of these metals are suitable since they have relatively high melting points and are relatively hard and corrosion resistant and many of them have high values of resistivity and all of them are relatively easy to sputter. While the conditions of sputtering and aging required to produce such a film with different metals will vary somewhat, nevertheless the principles employed in producing such resistors will be the same.

With such a combination of wiper brush and resistor film, the film experiences little wear, and accurate reproducibility and high precision are achieved. Furthermore, the potentiometer so formed is capable of continuous operation with relatively large power dissipation without injury to the film.

While the resistor so formed may also be employed as fixed resistors or as rheostats, they are particularly adapted for use as potentiometers, since it is desirable to minimize the current flowing through the wiper contact to the resistor film and the use of such low currents normally occurs in potentiometers.

Although only a few specific forms of the invention have been described herein in detail, it will be obvious that the invention is not limited thereto but is capable of a variety of mechanical embodiments. Various changes will now suggest themselves to those skilled in the art which will be made in the material, form, details of construction, arrangement of the elements, and methods of manufacture without departing from the principles of the invention. Reference is, therefore, made to the appended claims to ascertain the scope of the invention.

I claim:

1. A resistance element comprising: an insulating base member, a metallic film sputtered onto said base member, and a pair of filamentary terminals bonded to said metallic film at spaced points thereof.

2. A resistance element as defined in claim 1 wherein said metallic film consists of a metal selected from the group consisting of rhodium, rhenium, iridium and ruthenium.

3. A resistance element comprising: an insulating base member, a metallic film sputtered onto said base member, said film having a length much greater than its width, and a pair of filamentary terminals bonded to said metallic film at spaced points thereof that are spaced apart a distance much greater than the width of said film.

4. A resistance element comprising: an insulating base member, a metallic film sputtered onto said base member, said film being of substantially circular arcuate configuration, and a pair of filamentary terminals bonded to said metallic film at circumferentially spaced points thereof.

5. A resistance element comprising: an insulating base member, a pair of terminals consisting of metallic strips bonded thereto at spaced points thereon, and a metallic film sputtered onto said base member in overlapping relationship with said contact elements.

6. A resistance element as defined in claim 5 wherein said metallic film consists of a metal selected from the group consisting of rhodium, rhenium, iridium and ruthenium.

7. A resistance element comprising: a circular insulating base member, a pair of terminals consisting of radial strips of metal bonded thereto at spaced points thereon, and a metallic film of circular arcuate configuration substantially concentric with said base member bonded to said base member in overlapping relationship with said contact elements.

8. A resistance element as defined in claim 7 wherein said strips of metal consist of gold burned onto said base member.

9. A resistance element as defined in claim 8 wherein said metallic film consists of a thin film of sputtered metal selected from the group consisting of rhodium, rhenium, iridium and ruthenium.

10. A resistor comprising: an insulating plate having a non-zero linear temperature coefficient of expansion, a resistance element in the form of a conductive metallic film bonded to said plate the resistance of said film being a function of both strain and temperature, the thickness of said film being of such value that the temperature coefficient of resistance between two points of said film is less when the plate and film are heated together than it would be if the film were heated separately and unstressed, and leads attached to said film at said points.

11. A resistor comprising: an insulating plate having a positive linear temperature coefficient of expansion, a resistance element in the form of a conductive metallic film bonded to said plate, the resistance of said film between two points thereof increasing with strain alone and decreasing with temperature alone, whereby the change in resistance is less when the plate and film are heated together than it would be if the film were heated separately and unstressed, and leads attached to said film at said points.

12. A resistor comprising: an insulating plate having a non-zero linear temperature coefficient of expansion, a resistance element in the form of a conductive metallic film bonded to said plate, the thickness of said film being of such value that the change in resistance between the two points of said film due solely to heating of the film is about equal and opposite to the change in resistance that would occur solely on account of the strain of the base, and leads attached to said film at said points.

13. A resistor comprising: an insulating plate having a non-zero linear temperature coefficient of expansion, a circular arcuate resistance element in the form of a metallic film sputtered onto said plate, the resistance of said element being a function of both strain and temperature, the thickness of said film being of such value that the temperature coefficient of resistance between two points of said film is less when the plate and film are heated together than it would be if the film were heated separately and were unstressed, and leads attached to said film at circumferentially spaced points thereof.

14. A resistor for a circular potentiometer comprising: an insulating plate having a positive linear temperature coefficient of expansion, a circular arcuate resistance element in the form of a metallic film sputtered onto said plate, the resistance of said film between two points thereof increasing with strain alone and decreasing with temperature alone whereby the change in resistance is less when the plate and film are heated together than it would be if the film were heated separately and were unstressed, and leads attached to said film at circumferentially spaced points thereof.

15. A resistor for a circular potentiometer comprising: an insulating plate having a non-zero linear temperature coefficient of expansion, a circular arcuate resistance element in the form of a metallic film sputtered onto said plate, the resistance of said element being a function of both strain and temperature, the thickness of said film being of such value that the change in resistance between two points of said film due solely to heating of the film is about equal and opposite to the change in resistance that would occur solely on account of the strain of the base, and leads attached to said film at circumferentially spaced points thereof.

16. In a method of forming a resistor which comprises a metallic film bonded to an insulating base member, the steps which comprise: depositing onto said base member a film of metal, and aging the deposited film by heating it at an elevated temperature in the presence of air for a prolonged period.

17. In a method of forming a resistor which comprises a metallic film bonded to an insulating base member, the steps which comprise: depositing on said base member a film of metal, aging the deposited film by heating it at an elevated temperature in the presence of air for a prolonged period, measuring the electrical resistance between two points of the film during the heating process, and terminating the heating process when the drift of resistance has attained a relatively constant low value.

18. In a method of forming a resistor which comprises a metallic film bonded to an insulating base member, the steps which comprise: sputtering onto said base member a film of metal, and aging the film so formed by heating it at an elevated temperature in the presence of air for a prolonged period.

19. In a method of forming a resistor which comprises a metallic film bonded to an insulating base member, the steps which comprise: sputtering onto said base member a film of metal, aging the film so formed by heating it at an elevated temperature in the presence of air for a prolonged period, measuring the electrical resistance between two points of the film during the heating process, and terminating the heating process when the drift of resistance has attained a relatively constant low value.

20. In a method of forming a resistor which comprises a metallic film bonded to an insulating base member, the steps which comprise: depositing a film of metal onto said base member over an extended area thereof, measuring the electrical resistance of said film between two points thereof, and cutting said film to separate a portion thereof communicated with said points from a portion thereof not communicated with said points in order that the first mentioned portion shall have a predetermined electrical resistance.

21. In a method of forming a resistor which comprises a metallic film bonded to a circular insulating base member, the steps which comprise: forming electrodes bonded to said base member, sputtering a film of metal onto said base member over an extended area thereof in overlapping relationship with said electrodes, measuring the electrical resistance of said film between said electrodes, and cutting said film to separate a portion thereof contacting said electrodes from a portion thereof not contacting said electrodes in order that the first mentioned portion shall have a predetermined electrical resistance.

22. In a method of forming a resistor which comprises a metallic film bonded to a circular insulating base member, the steps which comprise: forming radial electrodes bonded to said base member, sputtering a film of metal onto said base member over an extended area thereof in overlapping relationship with said electrodes, cutting said film along lines concentric with said base member leaving only a first substantially circularly shaped portion of said film contacting said electrodes, measuring the electrical resistance of said first circularly shaped portion between said electrodes, and cutting said film along another line to leave a second substantially circularly shaped portion of said film of reduced width contacting said electrodes in order that the second circularly shaped portion shall have a predetermined electrical resistance.

23. In a variable resistor, a support structure, a shaft rotatably mounted on said support structure, an intermediate support member movable relative to said support structure, a base member composed of insulating material, said base member having a circular part spaced substantially from said shaft and parts thereof extending to positions adjacent said shaft, all parts of said base member having substantially the same linear coefficient of expansion, a metallic film bonded to said circular part, said metallic film constituting a circular resistance element, said insulated base member being secured to said support member only at points thereof adjacent the axis of said shaft, means interconnecting said support structure and said intermediate base plate for adjustably centering said resistance element about the axis of said shaft, and a contact element carried by said shaft in resiliently sliding electrical contact with said film.

24. In a variable resistor, a support structure, a shaft rotatably mounted on said support structure, an intermediate base plate movable relative to said shaft, a circular resistance element secured to said base plate, a contact supported by said shaft at a position radially displaced from the axis of said shaft, and means interconnecting said support structure and said intermediate base plate supporting said resistance element concentric with said shaft.

25. In a variable resistor, a support structure, a shaft rotatably mounted on said support structure, an intermediate base plate movable relative to said shaft, a circular resistance element secured to said base plate, a contact supported by said shaft at a position radially displaced from the axis of said shaft, and means interconnecting said support structure and said intermediate base plate for adjustably centering said resistance element about the axis of said shaft.

26. In a variable resistor, a support member, a shaft rotatably mounted on said support member, a base member composed of insulating material, said base member having a circular part spaced substantially from said shaft and parts thereof extending to positions adjacent said shaft, all parts of said base member having substantially the same linear coefficient of expansion, a metallic film bonded to said circular part, said metallic film constituting a circular resistance element, means securing said insulating base member to said support member only adjacent the axis of said shaft, and a contact element carried by said shaft arranged to move along a circular path in electrical contact with said film.

27. In a variable resistor, a support member, a shaft rotatably mounted on said support member, a base member composed of insulating material, said base member being in the form of a disk having a small aperture encircling said shaft, a metallic film of circular configuration bonded to said base member concentrically with said shaft a substantial distance from said aperture, said insulated base member being secured to said support member only at points thereof adjacent said aperture, and a contact element carried by said shaft arranged to move along a circular path in electrical contact with said film.

28. In a variable resistor, a support structure, a shaft rotatably mounted on said support structure, a circular resistance element secured to said support structure, an arm secured to said shaft and extending radially outwardly therefrom to a position beyond said circular resistance element, and a filamentary resilient contact member supported at the end of said arm and extending along a line tangent to an intermediate circle lying within said resistance element, the outer end of said contact member being resiliently urged into sliding electrical contact with said resistance element.

29. In a variable resistor, a case structure comprising: a cylindrical member and first and second end plates at opposite ends thereof all enclosing a cavity, a shaft rotatably mounted on said first end plate, a portion of said shaft extending into said cavity, an intermediate support member arranged in said cavity in movable relationship with said shaft, a base plate having an opening therein encircling said shaft, said base plate being attached to said support member only at points adjacent said shaft, a circular resistance element in the form of a metallic film sputtered onto said base plate on the side thereof facing said second end plate, means interconnecting said cylinder and said support member for adjustably centering said resistance element about said shaft, a conducting sleeve insulatingly mounted on the inner end of said shaft and insulated therefrom, a conducting arm secured to said sleeve and extending radially outwardly therefrom to a position beyond said circular resistance element, and a filamentary resilient contact member supported at the end of said arm and lying along a line tangent to an intermediate circle lying within said resistance element, the outer end of said contact member being resiliently urged into sliding electrical contact with said resistance element.

30. In a variable resistor, a case structure comprising: a cylindrical member and first and second end plates at opposite ends thereof, all enclosing a cavity, a shaft rotatably mounted on said first end plate, a portion of said shaft extending into said cavity, a circular resistance element secured to said first end plate within said cavity, a conducting sleeve insulatingly mounted on the inner end of said shaft and insulated therefrom, a conducting arm secured to said sleeve and extending radially outwardly therefrom to a position beyond said circular resistance element, a filamentary resilient contact member supported at the end of said arm and lying along a line tangent to an intermediate circle lying within the peripheral boundaries of said resistance element, said contact member having a curved finger formed in the outer end thereof, said finger being resiliently urged into sliding electrical contact with said resistance element, a conducting terminal insulatingly supported upon said second end plate and projecting into said cavity to a point radially displaced from said shaft, and a contact member extending toward said shaft, the inner terminal thereof being resiliently urged into sliding contact with said sleeve.

31. In a variable resistor, a case structure comprising: a cylindrical member and first and second end plates at opposite ends thereof, all enclosing a cavity, a shaft rotatably mounted on said first end plate, a portion of said shaft extending into said cavity, an intermediate support member arranged in said cavity in movable relationship with said shaft, a circular resistance element secured to said support member on the side thereof facing said second end plate, means interconnecting said cylinder and said support member for adjustably centering said resistance element about said shaft, a conducting sleeve insulatingly mounted on the inner end of said shaft and insulated therefrom, a conducting arm secured to said sleeve and extending radially outwardly therefrom to a position beyond said circular resistance element, a filamentary resilient contact member supported at the end of said arm and lying along a line tangent to an intermediate circle lying within said resistance element, the outer end of said contact member being resiliently urged into sliding electrical contact with said resistance element, a conducting terminal insulatingly supported upon said second end plate and projecting into said cavity to a point radially displaced from said shaft, and a contact brush member extending toward said shaft the inner terminal thereof being resiliently urged into sliding contact with said sleeve.

32. In a variable resistor: a support structure, a shaft rotatably mounted on said support structure, a circular resistance element secured to said support structure, said resistance element comprising a thin film of relatively conducting material, an arm secured to said shaft and extending radially outwardly therefrom to a position beyond said circular resistance element, and a contact member supported at the end of said arm and extending along a line tangent to an intermediate circle lying within said resistance element, said contact member comprising a resilient filamentary element consisting of a relatively soft metal, the outer end of said filamentary element being resiliently urged into sliding electrical contact with said resistance element.

33. In a variable resistor, a support structure, a shaft rotatably mounted on said support structure, a circular resistance element secured to said support structure, said resistance element comprising a thin film of relatively hard conducting material, an arm secured to said shaft and extending radially outwardly therefrom to a position beyond said circular resistance element, and a contact member supported at the end of said arm and extending along a line tangent to an intermediate circle lying within said resistance element, said contact member comprising a plurality of parallel resilient filamentary elements consisting of a relatively soft metal, the outer end of said filamentary element being resiliently urged into sliding electrical contact with said resistance element.

34. In forming a wiper brush for a potentiometer, the steps which comprise: wrapping a metallic wire helically about a cylindrical body, plating said body and said wire thereby bonding adjacent turns of the wire to each other, cutting the body of bonded wire so formed along a line transverse to the length of the wire, bending the body of plated wire so formed, severing a section of that body of wire, securing one end of said severed section to a wiper arm, coating the joint of said section and said wiper arm with acid-resisting material, immersing the arm and said section in acid to dissolve the metal plate that bonds together adjacent sections of the wire, and bending said wire to form a brush of desired configuration.

35. In forming a wiper brush for a potentiometer, the steps which comprise: wrapping a metallic wire helically about a cylindrical body, plating said body and said wire thereby bonding adjacent turns of the wire to each other, cutting the body of bonded wire so formed along a line transverse to the length of the wire, to form a body of plated parallel wires, securing one end of said body of wire to a wiper arm, then dissolving the metal plate that bonds together adjacent sections of the wire while preserving the joint of said body and said wiper arm.

36. In forming a wiper brush for a potentiometer, the steps which comprise: wrapping a metallic wire helically about a cylindrical body, plating said body and said wire thereby bonding adjacent turns of the wire to each other, cutting the body of bonded wire so formed along a line transverse to the length of the wire, to form a body of plated parallel wires.

37. In a method of forming a resistor which comprises a metallic film bonded to an insulating base member, the steps which comprise: sputtering a film of metal onto said base member for a prolonged period, measuring the electrical resistance of the film so formed on said base member while sputtering, and terminating the sputtering process when the resistance has attained a predetermined value.

References Cited in the file of this patent

UNITED STATES PATENTS

| | | |
|---|---|---|
| 352,074 | Van Depoele | Nov. 2, 1886 |
| 2,021,661 | Kisfaludy | Nov. 19, 1935 |
| 2,047,351 | Alexander | July 14, 1936 |
| 2,159,106 | Richter | May 23, 1939 |
| 2,440,691 | Jira | May 4, 1948 |
| 2,458,314 | Straub et al. | Jan. 4, 1949 |
| 2,475,379 | Strong | July 5, 1949 |
| 2,589,983 | Blodgett et al. | Mar. 18, 1952 |

OTHER REFERENCES

Techniques, Nat. Bureau of Standards, Circular 468, November 15, 1947.